United States Patent
Subotić et al.

(10) Patent No.: US 12,423,220 B2
(45) Date of Patent: *Sep. 23, 2025

(54) WHAT-IF ANALYSIS FOR NOTEBOOKS

(71) Applicant: Microsoft Technology Licensing, LLC, Redmond, WA (US)

(72) Inventors: Pavle Subotić, Belgrade (RS); Lazar Milikić, Palaiseau (FR); Milan Stojić, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,974

(22) Filed: Nov. 17, 2023

(65) Prior Publication Data
US 2024/0086310 A1  Mar. 14, 2024

Related U.S. Application Data

(63) Continuation of application No. 17/497,726, filed on Oct. 8, 2021, now Pat. No. 11,860,766.

(51) Int. Cl.
*G06F 11/36* (2025.01)
*G06F 8/41* (2018.01)
(Continued)

(52) U.S. Cl.
CPC .......... *G06F 11/3698* (2025.01); *G06F 8/436* (2013.01); *G06F 11/3624* (2013.01);
(Continued)

(58) Field of Classification Search
CPC ...... G06F 11/3664; G06F 40/30; G06F 8/436; G06N 20/00
(Continued)

(56) References Cited

U.S. PATENT DOCUMENTS 10,768,904 B2 * 9/2020 Wenskovitch, Jr. ........................ G06F 3/04847
11,880,381 B1 * 1/2024 Al-Alusi ........... G06F 16/24542
(Continued)

OTHER PUBLICATIONS

Rule, Adam, Aurélien Tabard, and James D. Hollan. "Exploration and explanation in computational notebooks." Proceedings of the 2018 CHI Conference on Human Factors in Computing Systems. 2018. pp. 1-12 (Year: 2018).*
(Continued)

*Primary Examiner* — Satish Rampuria
(74) *Attorney, Agent, or Firm* — Weaver IP L.L.C.

(57) ABSTRACT

Methods and systems provide for a notebook interactive programming environment, having out-of-order code-cell execution, which communicates potential cell execution outcomes. If an event handler receives an event (e.g., open notebook, code change, code execution, etc.) for a cell, without a request for a specific type of analysis (e.g., data-leakage, stale-state), intra-cell analysis is executed based-on the cell's abstract semantics, and an abstract state and pre-summaries are output that indicate the cell's propagation dependency (unbounded variables). If an analysis is associated with the event, starting with the stored abstract state, inter-cell analysis is recursively executed on successor cells having propagation dependencies, until a terminating criteria is reached. Outcomes (e.g., affected cell, line number, bug type, metrics, etc.) are sent via the notebook user-interface to warn users, ahead of concrete code execution, of hypothetical unsafe or safe actions in executing the notebook's code cells.

20 Claims, 7 Drawing Sheets

(51) Int. Cl.
*G06F 11/362* (2025.01)
*G06F 11/3698* (2025.01)
*G06F 40/18* (2020.01)
*G06F 40/30* (2020.01)
*G06N 20/00* (2019.01)

(52) U.S. Cl.
CPC .............. *G06F 40/18* (2020.01); *G06F 40/30* (2020.01); *G06N 20/00* (2019.01)

(58) Field of Classification Search
USPC .................................................. 717/120–168
See application file for complete search history.

(56) References Cited

U.S. PATENT DOCUMENTS

| | | | | |
|---|---|---|---|---|
| 11,954,429 | B2* | 4/2024 | Clement | G06N 3/084 |
| 12,147,445 | B1* | 11/2024 | Al-Alusi | G06F 9/4494 |
| 12,265,800 | B2* | 4/2025 | Lyu | G06F 9/451 |
| 2005/0273777 | A1* | 12/2005 | Grover | G06F 8/443 |
| | | | | 717/151 |
| 2018/0052891 | A1* | 2/2018 | Shuster | G06F 9/45558 |
| 2020/0065219 | A1* | 2/2020 | Bavishi | G06F 11/3608 |
| 2020/0310791 | A1* | 10/2020 | Gilbertson | G06F 8/433 |

OTHER PUBLICATIONS

Head, Andrew, et al. "Managing messes in computational notebooks." Proceedings of the 2019 CHI Conference on Human Factors in Computing Systems. 2019. pp. 1-12 (Year: 2019).*

Tillmann, Nikolai, et al. "Touchdevelop: Programming cloud-connected mobile devices via touchscreen." Proceedings of the 10th SIGPLAN symposium on New ideas, new paradigms, and reflections on programming and software. 2011. pp. 49-60 (Year: 2011).*

Chattopadhyay, Souti, et al. "What's wrong with computational notebooks? Pain points, needs, and design opportunities." Proceedings of the 2020 CHI conference on human factors in computing systems. 2020.pp. 1-12 (Year: 2020).*

Johnson, Jeremiah W. "Benefits and pitfalls of jupyter notebooks in the classroom." Proceedings of the 21st annual conference on information technology education. 2020. pp. 32-37 (Year: 2020).*

* cited by examiner

Notebook 102

```
1  d = genfromtxt('data.csv')
```

```
1  selector = SelectKBest(k=25)
2  x = selector.fit_transform(d)
```

```
1  x = genfromtxt('data2.csv')
```

```
1  x_train, x_test, y_train, y_test =
2    train_test_split(x, ...)
```

```
1  lr = LogisticRegression()
2  lr.fit(x_train, y_train)
3  y_pred = lr.predict(x_test)
```

FIG. 1A

Notebook

---

① `d = genfromtxt('data.csv')`

① `selector = SelectKBest(k=25)`
   `x = selector.fit_transform(d)`

① `x = genfromtxt('data2.csv')`

② `x_train, x_test, y_train, y_test =`
   `  train_test_split(x, ...)`

③ `lr = LogisticRegression()`
   `lr.fit(x_train, y_train)`
   `y_pred = lr.predict(x_test)`

FIG. 1B

Data Leak

---

`d = genfromtxt('data.csv')`

`selector = SelectKBest(k=25)`
`x = selector.fit_transform(d)`

`x = genfromtxt('data2.csv')`

① `x_train, x_test, y_train, y_test =`
   `  train_test_split(x, ...)`

`lr = LogisticRegression()`
`lr.fit(x_train, y_train)`
`y_pred = lr.predict(x_test)`

FIG. 1C

Stale State

WHAT-IF ANALYSIS FOR NOTEBOOKS

CROSS-REFERENCE TO RELATED APPLICATIONS

This application is a continuation of U.S. patent application Ser. No. 17/497,726, filed Oct. 8, 2021, entitled "WHAT-IF ANALYSIS FOR NOTEBOOKS," the entirety of which is incorporated by reference herein.

BACKGROUND

Notebooks provide an interactive environment for programmers to develop code, analyze data and inject interleaved visualizations in a single environment. Notebooks have become an increasingly popular development environment for data science. Notebooks may provide a dynamic read-eval-print-loop (REPL) experience where developers can rapidly prototype code while interleaving data visualization including graphs, textual descriptions, tables, etc. A notable peculiarity of notebooks is that the program (i.e., the notebook), is divided into non-scope inducing blocks of code called cells. Cells can be added, edited and deleted on demand by the user. More importantly, cells, regardless of their order in the notebook, may be executed (and re-executed) by the user in various sequences. This out-of-order execution model provides a level of incrementalism that improves productivity and flexibility.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage media described herein are provided for communicating potential cell execution outcomes in an interactive programming environment. For example, a system in accordance with an embodiment comprises a processor and a memory device. The memory device stores program code to be executed by the one or more processors. The program code comprises an analysis engine configured to receive an event related to a first cell. Based at least on determining that no analysis is associated with the event, the analysis engine is configured to execute intra-cell analysis for the first cell based on a current global abstract state and abstract semantics of the first cell, and store in memory an updated global abstract state generated based on the intra-cell analysis of the first cell. Based at least on determining that an analysis is associated with the event, the analysis engine is configured to, starting with the stored global abstract state, recursively execute, until a terminating criteria is reached, inter-cell analysis on each successor cell of a plurality of cells including the first cell for which the successor cell has a propagation dependency relative to a global abstract state generated by a respective predecessor cell of the successor cell. The analysis engine is further configured to communicate information related to outcomes of one or both of the intra-cell analysis and the inter-cell analysis.

As another example, a method in accordance with an embodiment comprises performing an analysis that includes receiving an event related to a first cell. The analysis further includes, based at least on determining that no analysis is associated with the event: executing intra-cell analysis for the first cell based on a current global abstract state and abstract semantics of the first cell; and storing in memory an updated global abstract state generated based on the intra-cell analysis of the first cell. The analysis also includes, based at least on determining that an analysis is associated with the event: starting with the stored global abstract state, recursively executing, until a terminating criteria is reached, inter-cell analysis on each successor cell of a plurality of cells including the first cell for which the successor cell has a propagation dependency relative to a global abstract state generated by a respective predecessor cell of the successor cell; and communicating information related to outcomes of one or both of the intra-cell analysis and inter-cell analysis.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1A shows a system comprising an example notebook analyzer user interface (UI) displaying a plurality of cells entered in a notebook, according to an example embodiment.

FIG. 1B shows an example result of a notebook analyzer what-if analysis that is displayed in a UI where a potential data leak has been discovered by the notebook analyzer, according to an example embodiment.

FIG. 1C shows an example result of a notebook analyzer what-if analysis displayed in a UI where a potential stale state has been discovered by the notebook analyzer, according to an example embodiment.

Figure 2:
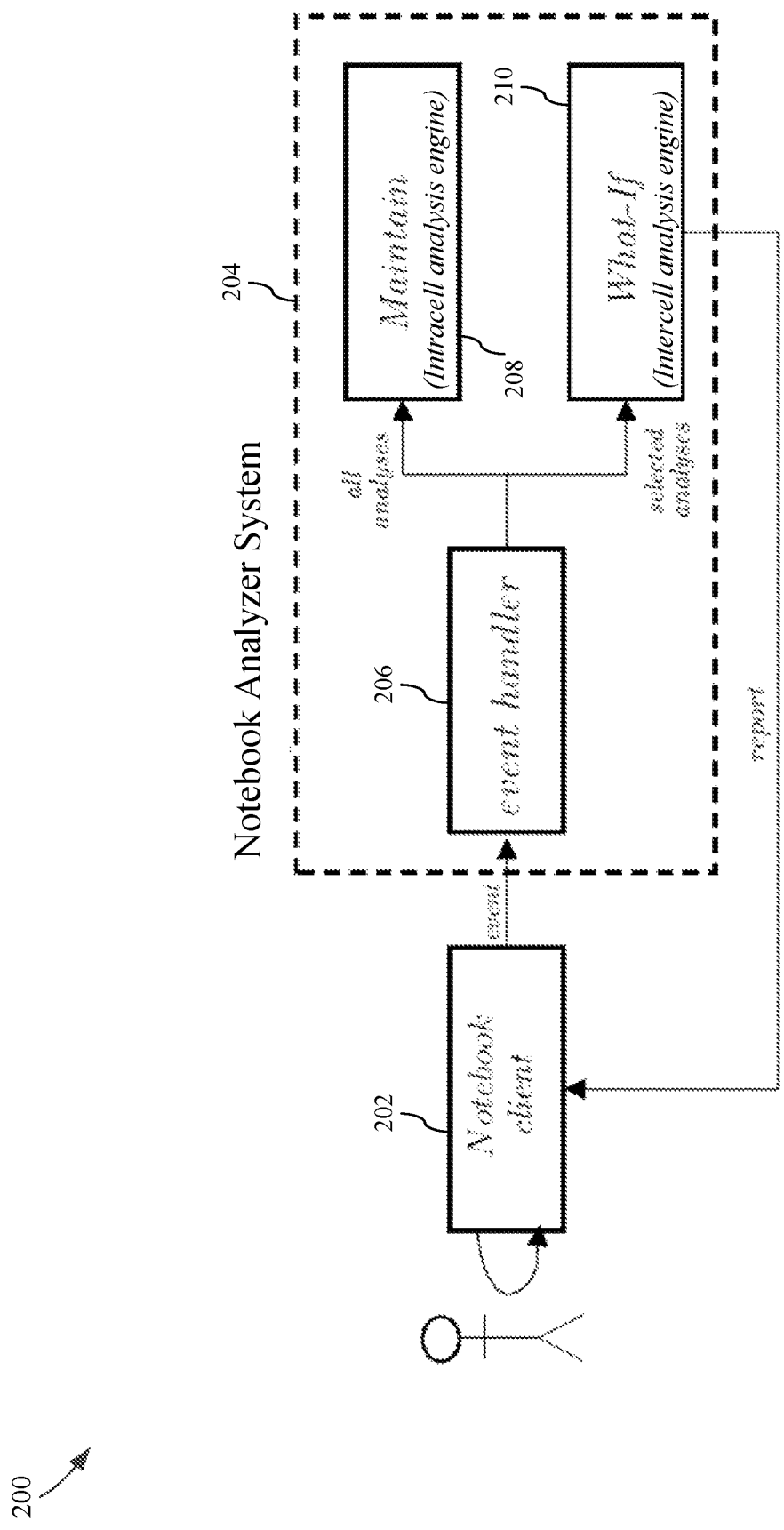
FIG. 2 is a high-level diagram of a system comprising a notebook interactive programming environment configured to perform maintenance and/or what-if analysis, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, notebooks provide an interactive environment for programmers to develop code, analyze data and inject interleaved visualizations in a single environment. Despite their flexibility, a major pitfall data scientists encounter is unexpected behavior caused by the out-of-order execution model of notebooks. As a result, data scientists face various challenges ranging from notebook correctness, reproducibility and cleaning. Methods and systems are provided that include a framework for performing static analyses on notebook semantics. This framework is general in the sense that it may accommodate a wide range of analyses that are useful for various notebook use cases. This framework has been instantiated on a diverse set of analyses, which have been evaluated on numerous real-world notebooks.

1. Introductory Summary

Notebooks have become an increasingly popular development environment for data science. As described above, notebooks provide a dynamic read-eval-print-loop (REPL) experience where developers can rapidly prototype code while interleaving data visualization including graphs, textual descriptions, tables etc. A notable peculiarity of notebooks is that the program i.e., notebook, may be divided into non-scope inducing blocks of code called cells (i.e., code cells). Cells may be added, edited, and deleted on demand by the user. Moreover, cells, regardless of their order in the notebook, may be executed (and re-executed) by the user in any given sequence. This feature provides a level of incrementalism that improves productivity and flexibility. At the same time, such execution semantics make notebook behavior notoriously difficult to predict and reproduce. Studies have shown difficulty in reproducing notebook. In one example, from a large set of notebooks, only 25% of notebooks could be executed without an error and less than 5% were trivially reproduceable. Moreover, an abundance of code smells and bugs have been observed in real world notebooks.

In the following example, code analysis tooling is introduced to improve notebook quality and communication of outcomes of various cell execution scenarios. FIG. 1A, shows a system 100 comprising an example notebook analyzer user interface (UI) displaying a plurality of cells entered in a notebook, according to an example embodiment. FIG. 1B shows an example result of a notebook analyzer what-if analysis displayed in the UI of system 100, where a potential data leak has been discovered by the notebook analyzer, according to an example embodiment. FIG. 1C shows an example result of a notebook analyzer what-if analysis displayed in the UI of system 100, where a potential stale state has been discovered by the notebook analyzer, according to an example embodiment. The example notebook analyzer UI shown in FIGS. 1A, 1B, and 1C are shown by way of example and not limitation. Other UI embodiments will be apparent to persons skilled in the relevant art(s) based on the discussions and descriptions provided herein.

Example 1.1 (a motivating example). System 100 comprises an example notebook 102 that has five cells (i.e., code cells), which are displayed via a user interface (UI). The cells are numbered from 1 to 5 in FIGS. 1A, 1B, and 1C. If the cells were part of a script instead of being part of a notebook, execution would proceed as if the cells were merged into a single cell and each statement would be executed as dictated by the regular program control flow (e.g., statements in cell 1 are executed sequentially, followed by cell 2, cell 3, and so on). However, in a notebook, any given cell may be executed at any given time (or in any order) by the user. This may produce a potentially infinite space of possible execution paths due to a lack of constraints on which order cells can be executed. Referring again to FIG. 1A, in a machine learning example, notebook 102 may read data from a file into a data frame in cell 1 and in cell 3. Cell 2 may standardize the data, and cell 4 may split the data into test and training segments. In cell 5, the model is trained, tested, and assessed for accuracy. It can be seen that several different orders of execution exist for this particular notebook. For example, one sequence of executing cells could be executing cell 3, cell 4, and cell 5. Another sequence could be executing cell 1, followed by cell 2, cell 4, and cell 5. Furthermore, in the following example scenario: a user may execute a sequence of cells comprising cell 1, cell 2, cell 4, and cell 5 (e.g., skipping cell 3). However, this execution sequence may result in a data leakage bug (e.g., leakage between training and test data) because the function in cell 2 normalizes the data, and then cell 4 splits the data into train and test data after the normalization, thus resulting in a data leak. If the user, after some investigation, identifies this problem, they may re-execute cell 1, skipping cell 2, and then execute cell 4 and cell 5. The user may be perplexed as the same issue re-occurs. The problem is that the user executed cell 4 which referred to the variable x, which was previously computed by cell 2. As can be seen, a user may quickly get into a confusing situation even for relatively simple notebooks, as the one shown in FIG. 1B.

Each of the bugs described above demonstrates the ease at which a seemingly simple data science script can result in unforeseen behavior in a notebook environment. Moreover, establishing the root cause is similarly difficult without engaging in time-consuming debugging endeavors. On the other hand, restricting notebook execution semantics removes the flexibility that makes notebooks popular. The present disclosure provides for the use of static analyses, applicable to notebook execution semantics, to retain notebook flexibility while reducing errors and debugging efforts, and includes warning to users, ahead of time, of hypothetical erroneous and/or safe actions. To this end, a notebook analyzer system is provided (e.g., notebook analyzer 204 shown in FIGS. 2 and 3), which offers notebook users the ability to perform, among other things, a what-if analysis on their actions or potential actions in a notebook programming environment. Actions (or events) may comprise, for example, opening a notebook, cell changes, cell executions, cell creation, cell deletion, etc. This notebook analyzer system 204 may report potential issues that may occur if an action is undertaken. For instance, referring to notebook 102 described in Example 1.1 and shown in FIG. 1B, notebook analyzer system 204 may warn the user that the event of executing cell 1 may lead to a data leakage by then executing cell 2, cell 4, and cell 5. Moreover, as shown in FIG. 1C, notebook analyzer system 204 may warn that the event of executing cell 1 can result in a stale state if cell 4 is executed before cell 2. Furthermore, the notebook analyzer 204 may recommend executing the sequence of cells 3, 4, and 5 as safe to execute after cell 1 is executed. The notebook analyzer system 204 may also support a wider range of static analyses. For example, further use cases of what-if analyses that may be implemented in the notebook analyzer are described below. Several important notebook development use cases including development time error detection, notebook reproducibility, notebook cleaning, among others may be facilitated and automated using these what-if analyses in the notebook analyzer system 204.

The notebook analyzer system 204 employs the theory of Abstract Interpretation to perform static analyses on cell code, thus guaranteeing in-cell termination for the price of an approximate analysis result (it is noted that static analysis is undecidable, in general, for Turing complete languages). The key idea is to over-approximate notebook semantics and computational state $\sigma$ and instead produce an abstract state $\sigma^\#$ which comprises an element of an abstract domain that encodes the analysis property of interest. When analyses are triggered by an event, an inter-cell analysis may be performed by propagating the analyses results to valid successor cells in the notebook. To select valid successor cells the notion of cell propagation dependencies is introduced, which allows pruning away unnecessary sequences of cell executions on-the-fly, and is parametrized by the current abstract state. In this way, abstract state is propagated efficiently while ensuring soundness and termination. This framework for performing static analyses on notebook semantics has been instantiated for several analyses tailored to data science and notebook programming. Notebook analyzer 204 has been evaluated on numerous real-world notebooks and has demonstrated its utility and scalability by an experimental evaluation. At least the following contributions are provided:

(1) What-if analysis for notebooks.

(2) A what-if framework that supports abstract domains for static analyses.

(3) Maintain and analyze phases: this architecture allows for an on-demand what-if analysis for instances where a user may not want a what-if analysis on all actions, all the time. This architecture allows for what-if analyses to be triggered by the user.

(4) Cell propagation dependency graph: to avoid unnecessary propagation, the use of pre-summary may determine if the state should be propagated.

(5) Instantiated analyses defined for notebooks.

(6) Custom properties rules i.e., "contracts": users may be allowed to specify correctness criteria on cells.

2. Overview

Figure 3:
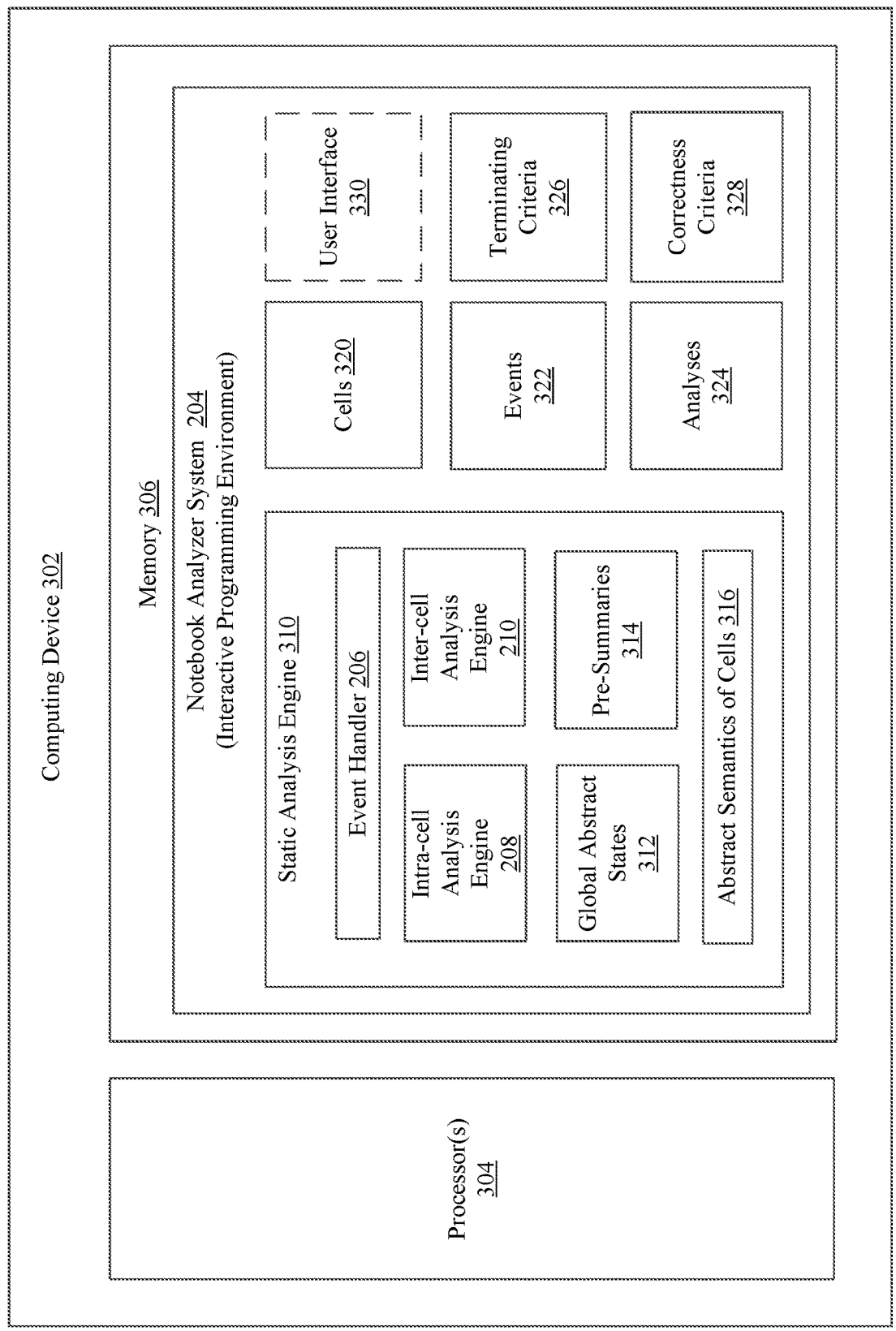
FIG. 3 is a block diagram of a system showing additional details of the system shown in FIG. 2, according to an example embodiment.

An overview is provided for the notebook analyzer (i.e., NBLYZER) static analysis framework for notebooks with reference to FIGS. 2 and 3. For instance, FIG. 2 is a high-level diagram of a system 200 comprising a notebook interactive programming environment configured to perform maintenance and/or what-if analysis, according to an example embodiment. As shown in FIG. 2, a system 200 comprises a notebook client 202 and the notebook analyzer system 204 (i.e., notebook analyzer 204). Notebook analyzer 204 may comprise an event handler 206, an intra-cell analysis engine 208, and an inter-cell analysis engine 210.

FIG. 3 is a block diagram of a system 300 showing additional details of the system shown in FIG. 2, according to an example embodiment. As shown in FIG. 3, system 300 comprises a computing device 302. Computing device 302 comprises a processor 304 and memory 306. Memory 306 may comprise a notebook analyzer system 204 that comprises a static analysis engine 310, cells 320, events 322, analyses 324, terminating criteria 326, correctness criteria 328, and a user interface 330. Static analysis engine 310 may comprise an event handler 206, an intra-cell analysis engine 208, an inter-cell analysis engine 210, global abstract states 312, pre-summaries 314, and abstract semantics of cells 316. These features of systems 200 and 300 are described in further detail as follows.

Processor 304 may include one processor or any suitable number of processors, which may include, for example, central processing units (CPUs), microprocessors, multi-processors, processing cores, and/or any other hardware-based processor types described herein or otherwise known. Processor 304 may be implemented in any type of mobile or stationary computing device. Examples of mobile computing devices include but are not limited to a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system), a wearable computing device (e.g., a head-mounted device including smart glasses such as Google® Glass™, or a virtual headset such as Oculus Rift® by Oculus VR, LLC or HoloLens® by Microsoft Corporation). Examples of stationary computing devices include but are not limited to a desktop computer or PC (personal computer), a server computer (e.g., a headless server), or a gaming console. Processor(s) 304 may run any suitable type of operating system, including, for example, Microsoft Windows®, Apple Mac OS® X, Google Android™, and Linux®.

Memory 306 may comprise one or more memory devices, which may include any suitable type(s) of physical storage mechanism, including, for example, magnetic disc (e.g., in a hard disk drive), optical disc (e.g., in an optical disk drive), solid-state drive (SSD), a RAM (random access memory) device, a ROM (read only memory) device, and/or any other suitable type of physical, hardware-based storage medium.

Cells 320 may store cells comprising code such as the cells 1, 2, 3, 4, and 5 represented in notebook 102.

Although a single computing device 302 is shown in FIG. 3, system 300 may be implemented over a plurality of computer devices 302 and a variety of platforms. Moreover, notebook client 202 and computing device 302 may be implemented in a single computing device or over a plurality of computing devices. UI 330 may be implemented in notebook analyzer system 204 and/or in a remote notebook client 202. In one example embodiment, notebook analyzer system 204 may be implemented into a notebook server (e.g., in computing device 302) as an extension, and notebook client 202 may be implemented in a user device. Notebook client 202 and the notebook server may communicate through communication channels via a network (not shown). Notebook client 202 may advise notebook analyzer 204 in the notebook server of events and send code to be executed to the notebook server. The notebook server in turn may perform the static analysis described herein and execute the cells using a run-time system. Based on the static analysis, resulting information may be transmitted back to notebook client 202, which may display or highlight, in UI 330, the cells, cell sequences, and/or lines of code, which may warn the user of potential problems in various scenarios of cell execution (e.g., as shown in FIGS. 1A, 1B, and 1C).

In some embodiments, a user may perform actions (or events 322) in notebook 100 via user interface 330, such as opening the notebook, adding cells, changing cells, executing cells, and deleting cells, among other things. For each event 322, the user may want to initiate a what-if analysis, essentially asking notebook analyzer 204, for example, what can occur if cell 1 is executed? This allows the user to, ahead of time, avoid putting notebook 102 in a state that will lead to an error. Conversely, the user may ask notebook analyzer 204 which executions are safe if cell 1 is executed. This allows the user to choose from a set of possible safe execution paths. Other examples of what-if questions include: which cells will become isolated if d is renamed to x in cell 2, and which cells are redundant in the opened notebook 102, etc. Each of these what-if questions may be useful for further use cases including reproducibility, security auditing, notebook cleaning and simplification, debugging, and education, among other things.

From a systems perspective a what-if analysis is a notebook event 322 that is associated or configured to a set of analyses 324. For example, asking about notebook safety will entail a certain set of analyses 324, and asking about notebook cleanliness will entail a different set of analyses 324. Notebook analyzer 204 therefore intercepts an event 322 from notebook client 202 and determines the appropriate mode of operation. The modes of operation are described below.

Maintenance mode. In the case that an event 322 comprises a cell execution and the user has not attached any analyses 324 to this event, (e.g., has not attached a what-if analysis), then notebook analyzer 204 may perform cell maintenance (i.e., intra-cell analysis) for the executed cell. Since a cell execution may result in the concrete state (not shown) of notebook 102 being updated, notebook analyzer 204 may provide for the global abstract state 312 of future invoked analyses to be maintained. In addition, code summaries that enable faster analyses are also to be updated. Notebook analyzer 204 may perform maintenance on a cell by updating (if the code has changed) intermediate program representations, including parsing the cell code into an abstract syntax tree (AST), converting the AST to a control flow graph (CFG), and producing use definition (U-D) chains. If the cell code has not changed, these intermediate program representations may be retrieved from a cache, for example.

Using the CFG, static analyses (e.g., intra-cell analyses) are performed to update notebook 102's abstract state (i.e., the resultant abstract state from a static analysis, which is used to perform static analyses in the future). In Section 3.2.1 a more detailed account of the maintenance process is provided.

What-If mode. For a what-if analysis (e.g., conducted for an event having a subset of analyses 324 associated with it), an inter-cell analysis may be performed. Here, starting from the global notebook abstract state 312, a set of possible output abstract states are computed corresponding to the set of possible cell executions up to a limit K depth of cells, or until no new information can be obtained from additional cell executions. In this inter-cell analysis process, for each cell (e.g., of notebook 102), inter-cell analysis engine 310 is configured to check which other cells have a propagation dependency, and propagate the computed abstract state to the dependent cells, for which the incoming abstract state is treated as an initial state. For each cell the output abstract state is checked against correctness criteria 328, if an error is found a report may be updated, which may serve as instruction for notebook client 202 to notify the user as to the consequences of the event. A report may include information such as affected cell, line number, bug type, as well as metrics such as runtime, memory usage, etc. FIGS. 1B and 1C show user interface 330 displays based on such a report. In Section 3.2.2 a detailed account of the maintenance process is provided.

In the case that the event is ignored by notebook analyzer 204 (i.e., non-execution event with no associated analyses) the notebook (e.g., notebook 102) may be executed as normally performed.

3. Technical Description

In this section a technical description of the notebook analyzer framework is provided.

3.1 Notebook Program Model 3.1.1 Notebook. A notebook N consists of a set of cells $c_i \in N$. A cell $c_i$ comprises a sequence of code statements $st_i^j(l, l')$ from a location $l$ to location $l'$ in a control flow graph (CFG). As an abuse of notation, $c_i$ is allowed to be used as a label.

3.1.2 Cell Execution. An execution of a cell $c_i$ over a state space $\Sigma = V \rightarrow D$ where V is the set of notebook variables and D is the concrete domain of execution, is denoted by $\sigma_{i+1} = [\![ c_{i+1} ]\!](\sigma_i)$. Here, $\sigma_{i+1} \in \Sigma$ is the output state, and $\sigma_i \in \Sigma$ is the input state previously computed by a cell $c_j$ where $i < i+1$ in the execution sequence.

3.1.3 Notebook Execution. A notebook execution is a potentially infinite execution sequence $\sigma_0 \rightarrow c_i \, \sigma_1 \rightarrow c_j \ldots$ where $\forall k \geq 0$, $c_k \in N$, $\sigma_k \in \Sigma$ and $i = j \square i \neq j$. The choice of the next cell in an execution sequence may be determined by the user from the space of all cells in a notebook.

3.2 Analysis Framework 3.2.1 Intra-Cell Analysis

Events and Analyses (e.g., events 322 and analyses 324). The inter-cell analysis may be triggered by an event $e \in Event$. An event may be attached to a set of analyses $A' \subset A$ by a mapping $M: Event \rightarrow \wp(A)$. An analysis a is a tuple of an abstraction label abs and condition cond. The condition cond is an assertion on an abstract state of the analysis of type abs.

Abstract state computation. From the sequence of statements in a cell, intra-cell analysis engine 208 is configured to construct a control flow graph (CFG), which is a directed graph that encodes the control flow of the statements in a cell. A CFG is defined as ⟨L, E⟩ where an edge (l, st, l') ∈E reflects the semantics of the cell statement st associated with the CFG edge from locations l to l' in the cell.

A sound over-approximation $\sigma^\#$ of a state $\sigma$ may be computed, by intra-cell analysis engine 208, by iteratively solving the semantic fixed-point equation $\sigma^\# = \sigma_0^\# \cup [\![\overline{st}]\!]^\#(\sigma^\#)$ using the abstract semantics $[\![\overline{st}]\!]^\#$ (e.g., abstract semantics 316) for statements $\overline{st}$ in the cell, and the initial abstract state ($\sigma_0^\#$). At the cell level, this computation is defined as $F_{ci}$ which may be referred to as an abstract cell transformer. $F_{ci}$ may take an abstract state and compute a fix-point solution in the abstract domain.

Figure 4:
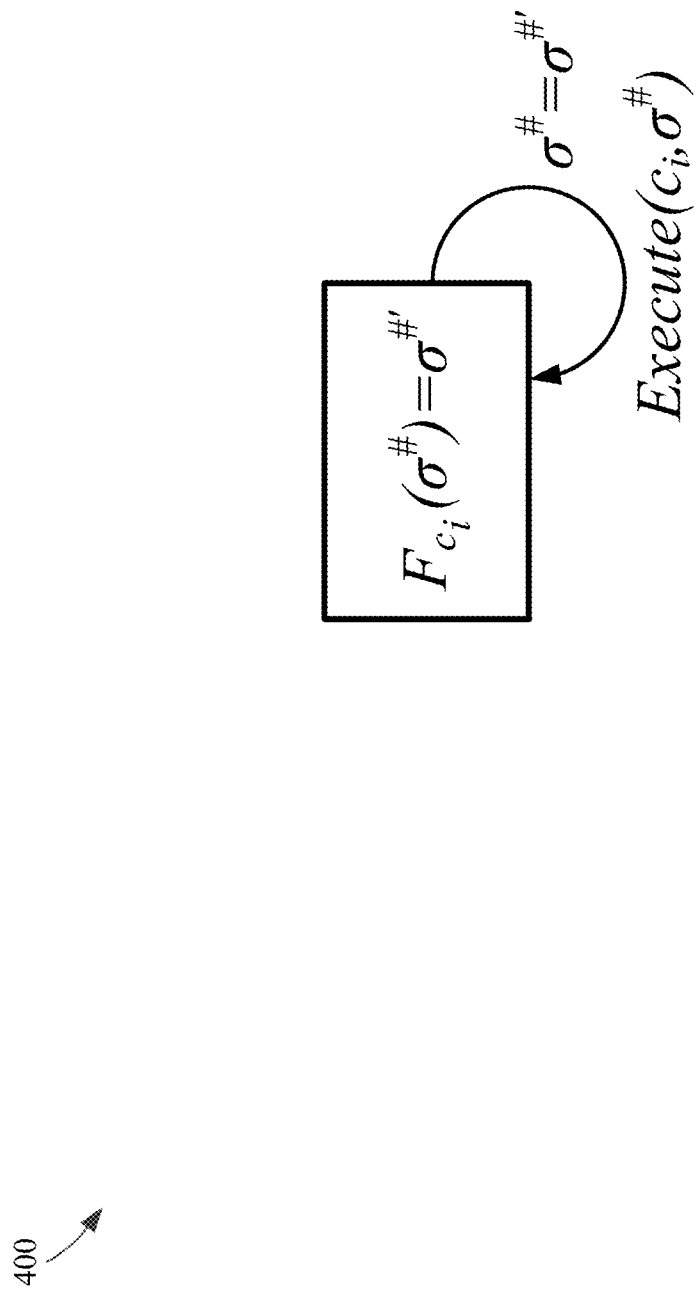
FIG. 4 is diagram showing execution of abstract semantics of a cell and updating a current global abstract state, which may be utilized in executing abstract semantics of another cell, according to an example embodiment.

Since a what-if analysis may not be triggered on every event 322, and yet a cell 320 is executed by the user, it is of small cost to maintain the abstract state 312 along with the concrete state (not shown), as the analyses are designed to be faster than performing a concrete execution. Therefore, intra-cell analysis engine maintains an abstract state $\sigma^\#$ which may be updated, each time a cell is executed, in parallel with the concrete executions of a notebook cell. At each execution, a cell transformer $F_{ci}$ for a cell $c_i$ is applied with the current global state 312, returning an updated global state, for example, $F_{ci}(\sigma^\#)=\sigma^\#$. This process is depicted in FIG. 4. For instance, FIG. 4 is diagram showing execution of abstract semantics of a cell and updating a current global abstract state, which may be utilized in executing abstract semantics of another cell, according to an example embodiment. Intra-cell analysis engine 208 perform this maintenance for at least two reasons. Firstly, a static analysis may be performed just before cell execution, and blocking execution if an error was found. Secondly, the global abstract state may be utilized to initiate a what-if analyses, once the what-if analysis is triggered by a user.

To analyze a cell, the static analysis problem may be reduced to the computation of the least solution of a fix-point equation $\sigma^\# = F_{ci}(\sigma^\#)$, $\sigma^\# \in \Sigma^\#$ where $\Sigma^\#$ is a domain of abstract properties, and $F_{ci}$ is the abstract transformer for the cell, (i.e., a composition of abstract statement transformers in the cell fix-point computation to solve the static analysis problem).

Within the abstract interpretation framework, several analyses can co-exist by constructing an independent product of abstract domains. Executing several transformers in parallel for cell $c_i$ may be denoted as $F_{ci}^A$ where A is a set of analyses (e.g., analyses 324).

Cell summary computation. Apart from computing the abstract state, cell pre-summaries 314 may be computed. Pre-summaries 314 comprise intra-cell computed preconditions on a cell that are used to determine if an abstract state should be propagated to that cell. Pre-summaries 314 may be computed for each cell at a notebook initialization time and/or during cell code changes.

In order to compute a pre-summary $pre_{ci}$ for cell $c_i$ a use-def (U-D) structure may be constructed using standard data-flow techniques. U-Ds provide mappings between variable usages and their definitions. A variable is a defined variable if it is used as a right-hand-side expression in an assignment statement or if it is a function st. A variable is used if it is in the left-hand-side of an assignment statement or in a function st. Thus, given a cell c the following sets of variables can be defined, where the sets of variables define definitions and usages.

$$def(c) = \{v | \forall st \in cs.t.\ v \text{ is defined in } st\} \text{ and}$$

$$use(c) = \{v | \forall st \in cs.t.\ v \text{ is used in } st\}$$

The U-D structure may be computed using a reaching definition data-flow analysis and provides a mapping use-def for all symbols $v \in V$ in the cell. If a $v \in use(c)$ has no definition, it is mapped to $\bot$. Using the U-D structure, the set of all unbounded variables in a cell may be computed. Unbound $(c) = \{v | v \in use(c) \wedge use\text{-}def(c) = \bot\}$. Thus, the most generic pre-summary $pre_c$ is defined as:

$$pre_c = unbound(c)$$

Depending on the analysis, the definition of $pre_{ci}$ may be expanded. For example, for access violation, variables in cells may be ignored where no access patterns occur, and a variable may not be used to change and propagate information (e.g., simply printing data).

3.2.2 Inter-Cell Analysis

State propagation. Inter-cell analysis engine 210 may be configured to compute a set of abstract states 312 for the entire notebook up to a depth K or as a fixpoint solution. The abstract state from a source cell is propagated to other cells if and only if there exists an edge that satisfies a cell propagation dependency. In some embodiments, when the propagation occurs, an intra-cell analysis computation is performed that treats the incoming cell abstract state as the initial state.

Figure 5:
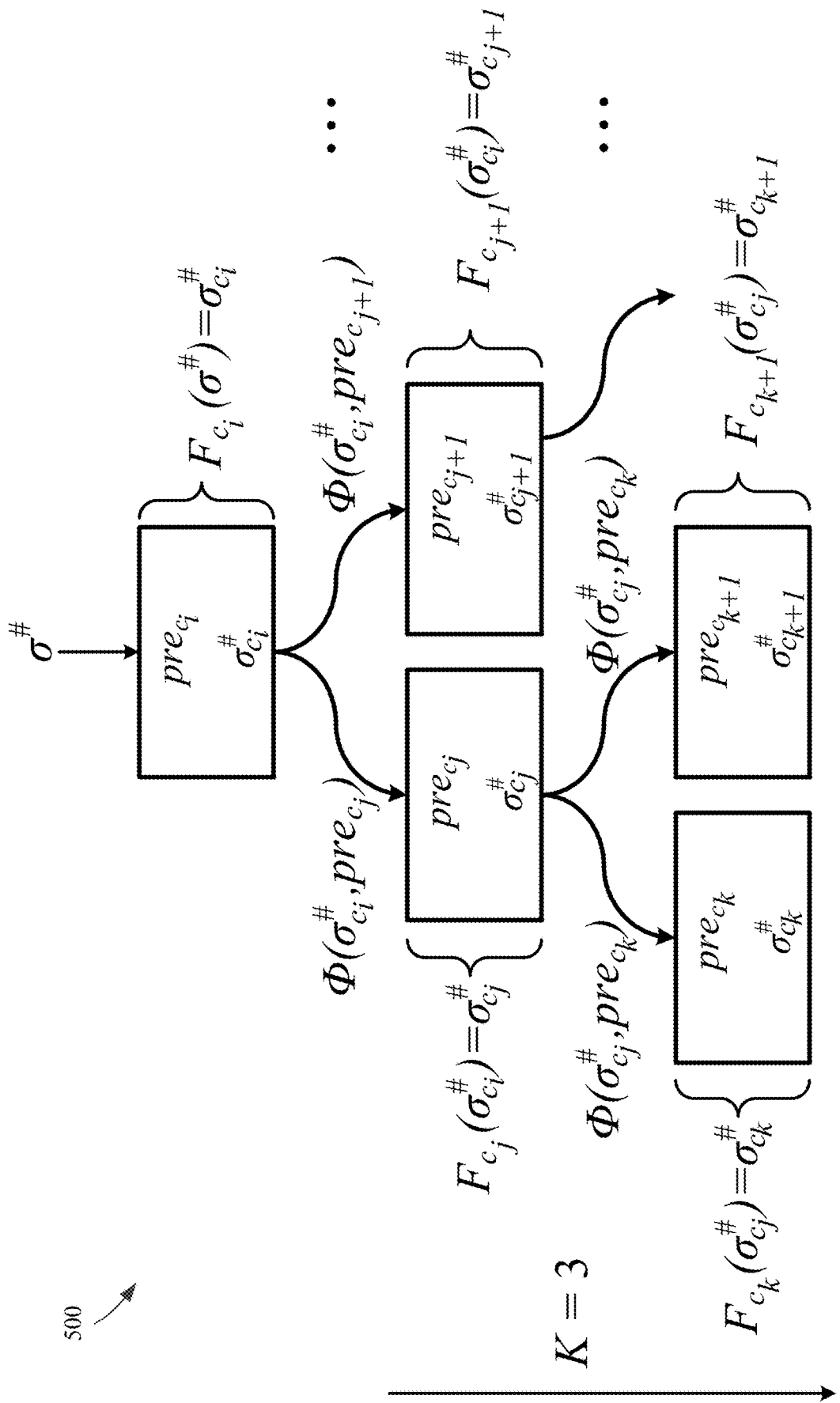
FIG. 5 is a diagram showing inter-cell analysis propagation, according to an example embodiment.

FIG. 5 is a diagram showing inter-cell analysis propagation, according to an example embodiment. Inter-cell analysis comprises recursive execution of abstract semantics 316 of a plurality of cells 320 using pre-propagation summaries (i.e., pre-summaries 314) of successor cells and abstract states 312 generated by predecessor cells for determining propagation dependencies and pruning independent cells from abstract state propagation paths.

Referring to FIG. 5, a what-if analysis may be triggered by an event e for a source cell $c_i$. A pre-defined value of $K \in \{1, \ldots, \infty\}$ is defined where $K = \infty$ means computation continues until a fix-point is reached, which may determine the depth of the analysis. The dependency is defined by determining if the abstract state $\sigma'_{ci}$ of the cell $c_i$ can be combined with the pre-summary $pre_{cj}$ of another cell $c_j$ (which may be cell $c_i$ itself). If there is a dependency, the unbounded vars in $c_j$ consume their values from $\sigma'_{ci}$. This propagation may be continued until a limit K where K=1 would mean only one successor cell is analyzed, and K=∞ means until a fix-point is reached. The choice of K may be user configured and/or analysis dependent.

Cell dependencies may be formalized in the form of a graph definition. Note, in some embodiments, the graph may be constructed lazily during abstract state propagation.

Definition 3.1 (Cell Propagation Dependency Graph). Assume the sequence of cells form a directed dependency graph G=⟨N, D⟩ where N is a finite set of cells, and (c, R, c') ∈R defines an arc from cell $c_i \in L$ to $c_j \in L$ iff$\phi(\sigma_{c_i}^\#, pre_{c_j})$. How $\phi(\phi_{c_i}^\#, pre_{c_j})$ is defined may be analysis specific. In Section 4 examples are provided for how analyses can be defined to fit into the notebook analyzer framework.

3.2.3 Implementation Examples

| Method 1 - Event_Handler(code, $c_i$, e, K) |  |
| --- | --- |
| 1: | global variables |
| 2: | $\sigma^\#$ (global abstract state) |
| 3: | pre (pre-summary mapping) |
| 4: | end global variables |
| 5: | A' = $\mathcal{M}$ (e) |
| 6: | if A' = 0 ∧ e = execute then |
| 7: | $\sigma^\#$ := Maintain(code, $c_i$, $\sigma^\#$, A ) |
| 8: | else |

| Method 1 - Event_Handler(code, $c_i$, e, K) |   |
| --- | --- |
| 9: | report := InterCell($\sigma^\#$, $c_i$, K, [ ], A' ) |
| 10: | return report |

An example technique is described in Method 1, where event handler 206 may be configured to receive an event and determine if the method should proceed in maintenance mode (intra-call analysis) or what-if analysis mode (inter-cell analysis). Given that an event e occurs, event handler 206 may be configured to obtain the following information: the source cell code code, the cell identifier $c_i$, the event e, and the global abstract state $\sigma^\#$. At line 5, event handler 206 determines if there exists any analyses A'⊆A that are attached to the event e. If not, a maintenance in line 7 is performed whereby intra-cell analysis engine 208 is configured to call Maintain (code, $c_i$,$\sigma^\#$, A) (e.g., intra-cell analysis) and update the global abstract state $\sigma^\#$ (e.g., global abstract state 312) as shown in FIG. 4. Otherwise, inter-cell analysis engine 210 may be configured to proceed with a what-if analysis by calling InterCell($\sigma^\#$, $c_i$, K, [ ], A') in line 9 and returning the results of the analysis, for example, to notebook analyzer system 204.

| Method 2 - Maintain(code, $c_i$, $\sigma^\#$, A) |   |
| --- | --- |
| 1: | if code not changed then |
| 2: | $\sigma^{\#'} := F_{c_i}^{A'}(cfg,[c_i], \sigma^\#)$ |
| 3: | return $\sigma^{\#'}$ |
| 4: | else |
| 5: | ast := parse(code) |
| 6: | cfg[$c_i$] := getCfg(ast) |
| 7: | ud := getUD(cfg) |
| 8: | pre[$c_i$] := getPre(ud) |
| 9: | $\sigma^{\#'} := F_{c_i}^{A}(cfg, \sigma^\#)$ |
| 10: | return $\sigma^{\#'}$ |

In Method 2, intra-cell analysis, namely cell maintenance, is described. In the function Maintain, intra-cell analysis engine 208 may be configured to first check to see if a code change occurred. If so, intra-cell analysis engine 208 may be configured to re-build the pre-summary $pre_{ci}$ and perform an intra-cell static analysis $F_{ci}$ (cfg, $\sigma^\#$) to produce a new abstract state $\sigma^\#$. If the code has not changed, since the abstract state may have changed in the meantime, intra-cell analysis engine 208 may be configured to perform an intra-cell analysis, for example, $F_{c_i}^{A}$ (cfg, $\sigma^\#$) for all analyses in A. Note that CFGs, U-Ds, pre-summaries 314, and abstract states 312 may be cached so that they may be computed only when needed, for example, for the code changes.

| Method 3 - InterCell($\sigma^\#$, $c_i$, K, report, A') |   |
| --- | --- |
| 1: | if K = 0 then return report |
| 2: | $\sigma^{\#'} := F_{c_i}^{A'}( \sigma^\# )$ |
| 3: | report' := Check($\sigma^{\#'}$, A', report ) |
| 4: | if $\sigma^{\#'}$ = $\sigma^\#$ then return report' |
| 5: | for all $c_j \in$ N do |
| 6: | if $\phi$ ($\sigma^{\#'}$, pre[$c_j$]) then |
| 7: | report' = report' + InterCell($\sigma^{\#'}$, $c_j$, K − 1, report', A') |
| 8: | return report' |

For the inter-cell method described in Method 3, inter-cell analysis engine 210 may be configured to perform a what-if analysis. Here, inter-cell analysis engine 210 may be configured to execute analyses in A' on cells, starting with the source cell $c_i$ in lines 2 and 3 of Method 3, and propagating the abstract state to cells that have a dependency i.e., that satisfy $\phi$ ($\sigma^{\#'}$, pre[$c_i$]), as shown in lines 6 and 7 of Method 3. If K=0 (line 1), meaning the required depth has been reached or a fixpoint is detected (line 4) (e.g., terminating criteria 326) the method terminates. The method (or algorithm) complexity is $O(n^K)$ in the number of cells n for a given K.

In some embodiments, an operation for some analyses may be to perform inter-cell widening. This operation will result in an extra condition in the code that checks if the abstract state increases on a given variable. If so, the value for that variable may be added as the top element. A narrowing pass can be also performed to improve precision. Thus far, only numerical analyses utilize this addition.

Notebook analyzer system 204 may be configured in various ways, and may operate in various ways, to perform these and further functions. For instance, FIG. 6 is a flowchart 600 of a method for performing intra-cell (e.g., maintenance) and inter-cell (e.g., what-if) analyses in an interactive programming environment with an out-of-order execution model (e.g., a notebook program), according to an example embodiment.

Flowchart 600 may be implemented in systems 200 and 300. For purposes of illustration, flowchart 600 is described with reference to FIG. 1A, FIG. 1B, FIG. 1C, FIG. 2, and FIG. 3. Other structural and operational embodiments will be apparent to persons skilled in the relevant art(s) based on the following discussion regarding flowchart 600.

Figure 6:
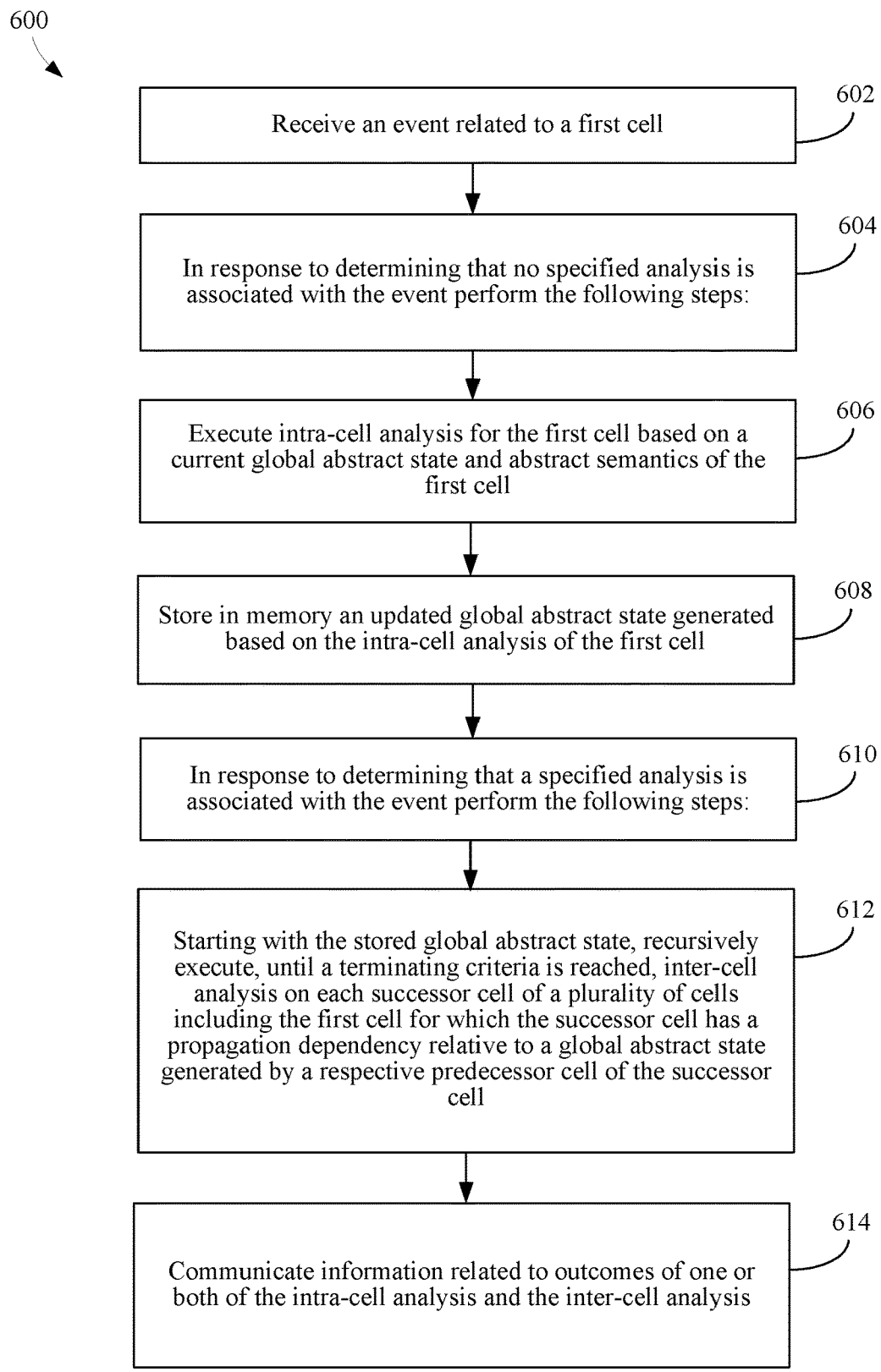
FIG. 6 is a flowchart of a method for performing intra-cell analysis (i.e., maintenance) and inter-cell analysis (i.e., what-if analysis) in an interactive programming environment with an out-of-order execution model, according to an example embodiment.

Flowchart 600 of FIG. 6 begins with step 602. In step 602, an event related to a first cell is received. For example, event handler 206 may be configured to receive an event 322. The event may be received for various reasons, for example, when a notebook is opened (e.g., opening notebook 102), cells are changed (e.g., a user may make changes to code in one or more of the cells of notebook 102), cell(s) are executed (e.g., one or more of cells 1-5 may be executed), cell creation (e.g., a user may create a new cell in notebook 102 or in another notebook), cell deletion (e.g., a user may delete one or more cells in notebook 102), etc. The cells and/or information related the cells may be stored as cells 320 in memory 306.

In step 604, in response to determining that no specified analysis is associated with the event, the following steps may be performed. For example, event handler 206 may be configured to determine whether any specific analyses are associated with the received event. In instances where there are no specified analyses associated with the event, the method may proceed as follows.

In step 606, intra-cell analysis may be executed for the first cell based on a current global abstract state and abstract semantics of the first cell. For example, intra-cell analysis engine 208 may be configured to determine whether code in the first cell has changed. In instances where the code has not changed, intra-cell analysis engine 208 may be configured retrieve abstract semantics 316 (e.g., the CFG for the first cell) from memory 306 (e.g., from a cache) to perform intra-cell analysis based on the current global abstract state 312 (e.g., $\sigma^\#$) and abstract semantics 316 of the first cell, e.g., $F_1^A$(cfg, $\sigma^\#$), for all analyses A. In instances where the code of the first cell has changed, intra-cell analysis engine 208 may be configured to convert the code of the first cell to intermediate program representations resulting in a format suitable for performing intra-cell analysis. For example, intra-cell analysis engine 208 may be configured to parse the cell code of the first cell into an abstract syntax tree (AST), convert the AST to a control flow graph (CFG), and generate use definition chains (U-D) based on the code of the first cell. Using this CFG (i.e., abstract semantics) for the first cell (e.g., $cfg_{ci}$), intra-cell analysis engine 208 may be configured to perform intra-cell analysis based on the current global abstract state 312 (e.g., $\sigma^{\#}$) comprising $\sigma^{\#'}=F_1^A$ (cfg, $\sigma^{\#}$). Moreover, intra-cell analysis engine 208 may be configured to determine a pre-summary 314 (e.g., $pre_{ci}$) for the first cell based on the U-D and AST, which may be utilized in performing inter-cell analysis in notebook 102.

In step 608, an updated global abstract state generated based on the intra-cell analysis of the first cell may be stored in memory. For example, in some embodiments, intra-cell analysis engine 208 may be configured to store one or more of the resultant abstract state $\sigma^{\#'}$, the determined CFG, the determined U-D, and/or the pre-summary for the first cell in memory 306 for use in later intra-cell and/or inter-cell analyses.

In step 610, in response to determining that a specified analysis is associated with the event the following steps may be performed. For example, event handler 206 may be configured to determine that one or more specified analyses are associated with the received event. For example, the association may be configured as a default setting or configured by a user in notebook 102. In instances where there are one or more specified analyses associated with the event, the method may proceed as follows.

In step 612, starting with the stored global abstract state, inter-cell analysis may be recursively executed, until a terminating criteria is reached, on each successor cell of a plurality of cells including the first cell, for which the successor cell has a propagation dependency relative to a global abstract state generated by a respective predecessor cell of the successor cell. For example, inter-cell analysis engine 310 may be configured to perform a what-if analysis where one or more specified analyses (e.g., A') are executed on cells in a notebook, starting with a source cell, where an output abstract state $\sigma^{\#}$ generated based on the source cell, may be propagated to one or more successor cells that have a propagation dependency relative to the output abstract state from the source cell. In this regard, the source cell may be referred to as a predecessor cell of the successor cells. This process may be repeated where each successor cell may become a predecessor cell to other cells in the notebook, and an output abstract state that is generated based on a predecessor cell, is propagated to dependent successor cells in the notebook. A successor cell may have a propagation dependency relative to a predecessor cell if the successor cell comprises unbounded variables such that the output abstract state $\sigma^{\#}$ of the predecessor cell can be applied to abstract semantics of the successor cell. Inter-cell analysis engine 310 may be configured to determine dependency of a successor cell based on a pre-summary of the successor cell (i.e., cells that satisfy $\phi(\sigma^{\#'}, pre_{cj})$ as described with respect to Method 3 above. A global abstract state $\sigma^{\#}$ may be generated by execution of abstract semantics of a predecessor cell, propagated to a respective dependent successor cell, and applied to execution of abstract semantics of the dependent successor cell in the inter-cell analysis. Inter-cell analysis may be terminated when a prescribed depth has been reached (e.g., K=0), or if a fixpoint solution is detected (e.g., $\sigma^{\#'}=\sigma^{\#}$).

In step 614, information related to outcomes of one or both of the intra-cell analysis and the inter-cell analysis may be communicated. For example, for each cell included in the inter-cell analysis, the output abstract state may be checked for errors based on a correctness criteria 328. If one or more errors are found, a report may be generated. In some embodiments, the report may be updated with each iteration of the inter-cell analysis. The report may comprise information such as identifying an affected cell, an affected line number, a bug type, metrics (e.g., runtime, memory usage, etc.), etc. Moreover, the outcomes information may be communicated for use in notebook client 202, for displaying feedback and or instructions for users via user interface 330. The information related to outcomes of inter-cell analysis may indicate potential outcomes that will occur in execution of concrete semantics of the same cells for the specified analyses (e.g., a data leak analysis, stale state analysis, etc.). The information in the report may be utilized to generate feedback and/or instructions via user interface 330, which may be displayed by computing device 302 and/or notebook client 202. FIGS. 1B and 1C show example feedback displayed in a user interface, which is based on the inter-cell analysis results and report. Also, information based on intra-cell analysis may be indicated in the user interface. For example, the user interface may indicate unbounded variables in cells. The user interface may indicate the consequences of the event that triggered the intra-cell and/or inter-cell analyses.

3.2.4 Analysis Criteria and Contracts

The Check function of the inter-cell analysis of method 3, checks the abstract state after a cell execution, and depending on correctness criteria 328, determines if a violation has occurred. For standard built-in analyses (see Section 4) this correctness criteria may be hard coded into notebook analyzer 204. However, for the available abstract domains, a user can define contracts on lines of code, pre or post conditions on cells or on the global notebook. Notebook analyzer 204 may expose the set of available abstractions, which can be seen as schema for which users can define queries in a logic-based domain specific language (DSL) that can assert expected behavior.

The analysis may provide a set of finite sets of objects from the AST and analysis results that the user can formulate as an error condition, attached to a notebook, cell, or code line. Languages that map to first order logic (e.g., with finite domains) can be used. For example, Datalog or structured query language (SQL) are both candidates.

4 Instantiated Analyses

In this section a brief outline of several instantiations of the analysis framework is provided.

4.1 Use Case I: Machine Language (ML) Data Leakage

Data Leakage is a bug specific to data science. In machine leaning applications, models typically require normalization of the input data, especially neural networks. Commonly, data is normalized by performing a division of the existing data by its average or maximum. Likewise, data is typically split into training and test subsets. If the normalization is performed using the overall data set, then information from the test set will now be influencing the training subset. For this reason, any normalization should be applied individually on the test and training subsets.

Data leakage is a common problem in data science scripts and the chance of it occurring is increased under the execution semantics of notebooks. To this end, light-weight analysis may be implemented to detect potential data leakages in notebooks. Our abstraction tracks which variable points to which data source. When an operation is performed on data that can introduce a leak, e.g., normalization, extrapolation etc. the data source propagation is reset. When variables are input into test and train functions, the system asserts that they do not point to the same data source.

4.1.1 Abstract Semantics

An abstract domain is defined, which maps a variable v to a set of variables or data source locations $\bar{v}$:

$$\forall v \in V \cdot \bar{v} \subseteq V \cdot v \mapsto \bar{v}$$

For each variable, a partial order is defined by a subset relation such that for a given variable v:

$$v \to \bar{v} \subseteq v \to \bar{v} \text{ iff } \bar{v} \subseteq \bar{v}'$$

Meet and join are similarly defined using srt union and intersection, respectively.

Abstract semantics are defined for two categories of operations, namely:

(1) reset:

$$\lambda \sigma^\# \cdot [\![ \bar{y} = f(\bar{x}) ]\!] = \{\forall y \in \bar{y}, \sigma^\#[y \to \bar{x}] \text{ iff } f \in KB_{reset}\}$$

(2) propagate:

$$\lambda \sigma^\# \cdot [\![ \bar{y} = f(\bar{x}) ]\!] = \left\{ \forall\, y \in \bar{y},\, \sigma^\#(y) u \bigcup_{x \in \bar{x}} \sigma^\#(x) \text{ iff } f \in KB_{reset} \right\}$$

The reset operations forget any previous mappings and assign the left-hand-side variable(s) to the variable (or filename) that is being read or transformed. The operations that are classes as resets are obtained by a knowledge base KB that comprises context on used libraries etc. f can be any operation including the identity operation i.e., simple assignment.

Lastly, to enable inter-cell propagation the following rule is defined:

$$\phi(\sigma_{c_i}^\#, pre_{c_j}) = pre_{x_j} \subseteq \{v : v \to \bar{x} \in \sigma_{c_i}^\#\} \subseteq \forall v \in pre_{c_j} : \sigma^\#[v] \neq \bot$$

Joins and meets that arise from control flow are handled by the join operations of the abstract domain, i.e., pointwise set union and disjunction. This analysis can be performed on a variety of sizes of K and may be user dependent. In some embodiments, users may achieve good results with K≈3.

4.1.2 Analysis Example

Considering the example in FIGS. 1A, 1B, and 1C, as noted above, a potential data leakage is shown in FIG. 1B, which depends on the execution order of the cells, for example, if cell 2 is executed before cell 4 and 5. The following describes how a what-if analysis can detect this violation. Assume a what-if analysis is triggered for the event of executing cell 1. In other words, a question may be asked as to what can happen if in future executions if cell 1 is executed? First an abstract state is computed for cell 1 which is:

$$\sigma_{c_i}^\# = d \to \{data, csv\}$$

Using abstract state and preconditions of other cells, a value is assessed for:

$$\phi(\sigma_{c_i}^\#, pre_{c_j})$$

for all cells $c_j$ in the notebook. It may be found that $\phi_{c_i}$ holds for cell 2. Next, the abstract state for cell 2 is computed with the abstract state of cell 1 as the initial state, obtaining:

$$\sigma_{c_2}^\# = d \to \{data.csv\}, x \to \{d\}$$

as fit transform∈ $KB_{reset}$

The following is evaluated:

$$\phi_{c_2}(\sigma_{c_2}^\#, pre_{c_j})$$

for all cells $c_j$ in the notebook, and it may be found that cell 4 holds. Here, all split variables map to d. Again, it may be found that propagation can proceed to cell 5 and the data leakage condition may be applied: if any arguments of train and test functions point to the same data, a potential data leak may occur. More formally this can be defined as a contract as follows:

$$\text{Error in notebook} = \left\{ \begin{array}{lll} \exists f \in TrainCall, & \exists g \in TestCall, \\ a \in Args(f), & b \in Args(g), \\ Points(a) \cap & Points(b) = \emptyset \end{array} \right\}$$

Here, TrainCall, TestCall, Args are relations obtained from the AST and Points is obtained from the abstract domain. With this analysis condition, NBLYZER (a notebook analyzer) may warn the user that the execution sequence of cells executions <1, 2, 4, 5> may result in a data leakage in cell 5 and no alternative safe execution path may exist that is predicated on the event of cell 1 being executed.

4.2 Use Case II: Code Impact Analysis

When a change occurs, users may like to know what other code is affected or unaffected by that change. This has a number of usages including assisting in notebook reproducibility, stale state detection, code cleanup and code simplification. For scripts, many of these analyses are a straightforward information flow analysis, however, due to the semantics of notebooks, where any cell can be executed in any order, determining the impact of a change may become more challenging.

4.2.1 Abstract Semantics

An abstract domain may be defined, which maps a variable and symbols (function names, etc.) v to a Boolean t to f indicating which variable has changed or not. Practically, the abstract domain may be implemented as a set of variables $\bar{v}$. If a variable is in the set it has changed, otherwise it hasn't. Thus, the lattice may be a standard powerset lattice common in data flow analyses.

When a variable on the left-hand-side of a statement has changed, the right-hand-side may be inserted in the set. Below it is stated the propagation semantics for selected statements.

(1) Assignment:

$$\lambda \sigma^\# \cdot [\![ \bar{y} = f(\bar{x}) ]\!] = \left\{ \begin{array}{l} \sigma^\# \cup \{y\} \text{ iff } f \in \sigma^\# \vee \\ \exists x \in \bar{x} \text{ s.t. } x \in \sigma^\# \end{array} \right\}$$

(2) Functions:

$$\lambda \sigma^\# \cdot [\![ f(\bar{x}) \{\bar{y}\} ]\!] = \left\{ \begin{array}{l} \sigma^\# \cup \{f\} \text{ iff } \\ \exists x \in x \text{ s.t. } x \in \sigma^\# \vee \\ \exists y \in y \text{ s.t. } y \in \sigma^\# \end{array} \right\}$$

Similarly, joins and meets that arise from control flow may be handled by the join operations of the abstract domain, i.e., set union and disjunction.

4.2.2 Analysis Variations

Safe cell analysis. Safe cell analysis identifies cells which have a direct dependency, that is all variables will have the most updated values in the incoming state. For this analysis, the same domain of the change impact analysis is used, but $\phi$ is redefined to correctly propagate the abstract state as follows:

$$\phi_{c_i}(\sigma_{c_i}^\#, pre_{c_j}) = pre_{c_j} \downarrow \{v : v \in \sigma_{c_i}^\#\}$$

This analysis may be useful for guiding users to which cells can be executed to avoid staleness, thus it may be used to improve notebook reproducibility.

Stale cell analysis. Stale cell analysis may be opposite of the above safe analysis. They highlight cells that have intermediate safe cells between them and the source cell. For this analysis ϕ is defined as the following:

$$\phi_{e_i}(\sigma_{e_i}^{\#}, pre_{e_j}) = \{v : v \in \sigma_{e_i}^{\#}\} \cap pre_{e_j} \neq \emptyset$$

Isolated cell analysis. An isolated cell is a cell that does not have any dependency with other cells. Such cells are typically found during experimentation phases of development and may be identified as candidates for cleanup. This analysis is performed on K=1. It has the negated ϕ condition of freshness and staleness.

$$\phi_{e_i}(\sigma_{e_i}^{\#}, pre_{e_j}) = \{v : v \to \bar{x} \in \sigma_{e_i}^{\#}\} \cap pre_{e_j} = \emptyset$$

$$\phi_{e_i}(\sigma_{e_i}^{\#}, pre_{e_j}) = \{v : v \to \bar{x} \in \sigma_{e_i}^{\#}\} \cap pre_{e_j} = \emptyset$$

as well as $\phi_{e_j}(\sigma_{e_j}^{\#}, pre_{e_j})$

Idle cell analysis. Idle cells are cells that do not contribute to the computation and if pruned, will not affect the end result of the notebook computation. They are cells that may have previously been used for debugging, experimentation and a candidates for notebook cleanup. This analysis is performed on K=1 for all cells in a notebook it checks.

4.2.1 Analysis Example

Considering the example in FIG. 1C, it can be seen that the execution of cell 1 followed by cell 4 will create staleness. This is because cell 2 is fresh and is the intermediate cell between cell 1 and cell 4 dependencies. If the file in cell 1 is changed, then the variable d is in the abstract domain. As before, this is propagated to cell 2 and hence, x is also in the abstract domain. When further propagating to cell 4 (i.e., K=2) reporting may indicate that all the rhs variables are stale if the cell execution sequence 1, 4 is performed.

5. Integration into Notebook

As described above, in one example embodiment, what-if analysis techniques may be implemented in a notebook server (e.g., in in computing device 302) where a notebook client (e.g., notebook client 202) and the server may communicate through communication channels. The notebook client may advise the server of events and send code to be executed. The server, in-turn, may perform the static analysis and execute the code using a run-time system. When the analysis is complete, information may be sent back to the notebook client. The information may include, for example, cells, cell sequences, and lines of code to highlight and warn the user. This implementation may target the python language. For example, notebook analyzer 204 may parse the code into an AST from which it constructs a control flow graph and usage-definition chains. These low-level code representations may be used to perform the static analyses implemented in the notebook analyzer 204 framework. In some embodiments, a user can manually trigger the what-if analysis and pre-select which built-in analyses are turned on. The user may be warned, in notebook client 202, of potential code violations through use of graphical code, cell highlighting, and messages. The notebook client user interface vary depending on the client used.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 200 and 300 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SOC), a field programmable gate array (FPGA), an application specific integrated circuit (ASIC), a trusted platform module (TPM), and/or the like. A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 7:
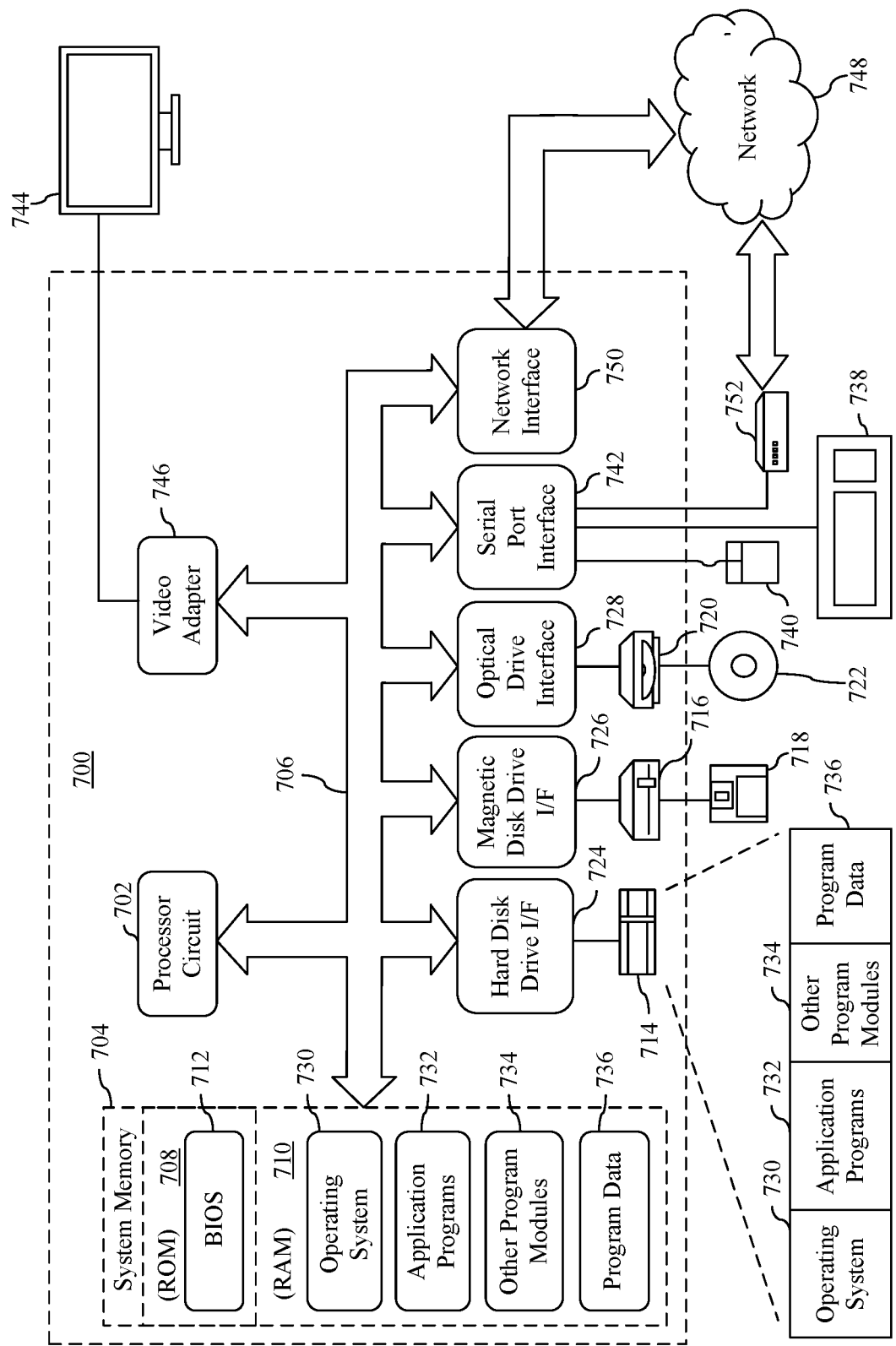
FIG. 7 is a block diagram of an example processor-based computer system that may be used to implement various embodiments.

FIG. 7 is a block diagram of an example processor-based computer system 700 that may be used to implement various embodiments. System 700 may include any type of computing device, mobile or stationary, such as a desktop computer, a server, a video game console, etc. For example, system 700 may comprise any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

System 700 may be implemented in one or more computing devices containing features similar to those of computing device 700 in stationary or mobile computer embodiments and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing processor(s) 304, memory 106, notebook analyzer 204, static analysis engine 206, intra-cell analysis engine 208, intracell analysis engine 210, notebook client 202, event handler 206, and flowchart 600 (including any step thereof), and/or further embodiments described herein. Program data 736 may include cell 1, cell 2, cell 3, cell 4, cell 5, global abstract states 312, pre-summaries 314, abstract semantics 316, cells 320, events 322, analyses 324, terminating criteria 326, correctness criteria 328, and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In an embodiment, a system for communicating potential cell execution outcomes in an interactive programming environment comprises a processor and a memory device. The memory device stores program code to be executed by the processor. The program code comprises an analysis engine configured to receive an event related to a first cell. Based at least on determining that no analysis is associated with the event, the analysis engine executes intra-cell analysis for the first cell based on a current global abstract state and abstract semantics of the first cell and stores in memory an updated global abstract state generated based on the intra-cell analysis of the first cell. Based at least on determining that an analysis is associated with the event, starting with the stored global abstract state, the analysis engine recursively executes, until a terminating criteria is reached, inter-cell analysis on each successor cell of a plurality of cells including the first cell for which the successor cell has a propagation dependency relative to a global abstract state generated by a respective predecessor cell of the successor cell, and communicates information related to outcomes of one or both of the intra-cell analysis and the inter-cell analysis.

In an embodiment of the foregoing system, prior to executing intra-cell analysis for the first cell, based at least on determining that code of the first cell has changed, the analysis engine is further configured to convert the code of the first cell to the abstract semantics of the first cell comprising a format suitable for executing the intra-cell analysis on the first cell.

In an embodiment of the foregoing system, the analysis engine is further configured to execute intra-cell analysis on each of the plurality of cells prior to executing the inter-cell analysis on each successor cell.

In an embodiment of the foregoing system, the execution of the intra-cell analysis on each of the plurality of cells includes performing a pre-summary for each cell for determining whether each cell has a propagation dependency for receiving a global abstract state propagated from a respective predecessor cell.

In an embodiment of the foregoing system, a successor cell has a propagation dependency on a respective predecessor cell if an abstract state generated by execution of abstract semantics of the respective predecessor cell is propagatable to the successor cell in the inter-cell analysis based on unbounded variables in the successor cell.

In an embodiment of the foregoing system, a global abstract state generated by execution of abstract semantics of a predecessor cell is propagated to a respective successor cell and applied to execution of abstract semantics of the successor cell in the inter-cell analysis.

In an embodiment of the foregoing system, the analysis engine is further configured to check for errors in the generated global abstract state based on a correctness criteria to generate the information related to the outcomes.

In an embodiment of the foregoing system, the terminating criteria is based on a parameter configured in the interactive programming environment or is based on results of the abstract cell execution.

In an embodiment of the foregoing system, the analysis is configurable via a user interface.

In an embodiment of the foregoing system, the analysis comprises a stale state analysis, a machine learning data leakage analysis, a numerical out-of-bounds error analysis, an analysis to detect application programming interface (API) contract violations, or an analysis to detect logic errors causing a cell not to be executed.

In an embodiment of the foregoing system, the interactive programming environment is a notebook.

In an embodiment, a method for communicating potential cell execution outcomes in an interactive programming environment comprises performing an analysis. The analysis comprises receiving an event related to a first cell. Based at least on determining that no analysis is associated with the event, the analysis further comprises executing intra-cell analysis for the first cell based on a current global abstract state and abstract semantics of the first cell, and storing in memory an updated global abstract state generated based on the intra-cell analysis of the first cell. Based at least on determining that an analysis is associated with the event, the analysis comprises, starting with the stored global abstract state, recursively executing, until a terminating criteria is reached, inter-cell analysis on each successor cell of a plurality of cells including the first cell for which the successor cell has a propagation dependency relative to a global abstract state generated by a respective predecessor cell of the successor cell, and communicating information related to outcomes of one or both of the intra-cell analysis and inter-cell analysis.

In an embodiment of the foregoing method, prior to executing intra-cell analysis for the first cell, based at least on determining that code of the first cell has changed, converting the code of the first cell to the abstract semantics of the first cell comprising a format suitable for executing the intra-cell analysis on the first cell.

In an embodiment of the foregoing method, intra-cell analysis is executed on each of the plurality of cells prior to executing the inter-cell analysis on each successor cell.

In an embodiment of the foregoing method, the executing of the intra-cell analysis on each of the plurality of cells includes performing a pre-summary for each cell for determining whether each cell has propagation dependency for receiving a global abstract state propagated from a respective predecessor cell.

In an embodiment of the foregoing method, a successor cell has a propagation dependency on a respective predecessor cell if an abstract state generated by execution of abstract semantics of the respective predecessor cell is propagatable to the successor cell in the inter-cell analysis based on unbounded variables in the successor cell.

In an embodiment of the foregoing method, a global abstract state generated by execution of abstract semantics of a predecessor cell is propagated to a respective successor cell and applied to execution of abstract semantics of the successor cell in the inter-cell analysis.

In an embodiment of the foregoing method, errors in the generated global abstract state are checked for based on a correctness criteria to generate the information related to the outcomes.

In an embodiment, a computer-readable medium having program code recorded thereon that when executed by at least one processor causes the at least one processor to perform a method for communicating potential cell execution outcomes in an interactive programming environment. The method comprises performing an analysis. The analysis comprises receiving an event related to a first cell. Based at least on determining that no analysis is associated with the event, the analysis further comprises executing intra-cell analysis for the first cell based on a current global abstract state and abstract semantics of the first cell, and storing in memory an updated global abstract state generated based on the intra-cell analysis of the first cell. Based at least on determining that an analysis is associated with the event, the analysis further comprises starting with the stored global abstract state, recursively executing, until a terminating criteria is reached, inter-cell analysis on each successor cell of a plurality of cells including the first cell for which the successor cell has a propagation dependency relative to a global abstract state generated by a respective predecessor cell of the successor cell, and communicating information related to outcomes of one or both of the intra-cell analysis and the inter-cell analysis.

In an embodiment of the foregoing computer-readable medium, errors in the generated global abstract state are checked for based on a correctness criteria to generate the information related to the outcomes.

VI. Conclusion

While various embodiments of the present disclosed subject matter have been described above, it should be understood that they have been presented by way of example only, and not limitation. It will be understood by those skilled in the relevant art(s) that various changes in form and details may be made therein without departing from the spirit and scope of the disclosed subject matter as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for communicating potential cell execution outcomes in an interactive programming environment, the system comprising:
 a processor;
 a memory device, the memory device storing program code to be executed by the processor, the program code comprising:
  an analysis engine that:
   receives an event related to a first cell;
   executes, in an abstract domain, first intra-cell static analysis for the first cell based on a current global abstract state and abstract semantics of the first cell to generate an updated global abstract state, the first intra-cell static analysis comprising generation of a pre-summary specifying a pre-condition of the first cell;
   subsequent to executing the first intra-cell analysis, determines code of the first cell has changed; and
   responsive to the determination that the code of the first cell has changed:
    re-builds the pre-summary, and
    executes, in the abstract domain, second intra-cell static analysis for the first cell based on the updated global abstract state and the abstract semantics of the first cell to generate a new updated global abstract state.

2. The system of claim 1, wherein the analysis engine further:
 parses code of the first cell to generate an abstract syntax tree (AST); and
 converts the AST into a directed graph that encodes a control flow of statements in the first cell.

3. The system of claim 2, wherein to execute the first intra-cell static analysis for the first cell, the analysis engine further:
 utilizes the directed graph to generate the updated global abstract state.

4. The system of claim 1, wherein the pre-condition of the first cell is used in determining if the first cell has a propagation dependency for receiving a global abstract state propagated from a second cell.

5. The system of claim 4, wherein to generate the pre-summary, the analysis engine further:
 utilizes a use-def structure to compute an unbound variable of the first cell, the use-def structure comprising a mapping between a usage of variables and respective definitions of variables.

6. The system of claim 1, wherein to execute the first intra-cell static analysis for the first cell, the analysis engine further:
 executes multiple approximate global states based on the abstract semantics.

7. The system of claim 1, wherein to generate the pre-summary for the first cell, the analysis engine further:
 determines there is no access pattern with respect to the first cell; and
 generates the pre-summary by ignoring a variable in the first cell based on the determination that there is no access pattern with respect to the first cell.

8. The system of claim 1, wherein the analysis engine further:
 stores in memory the updated global abstract state generated based on the first intra-cell static analysis of the first cell.

9. A method for communicating potential cell execution outcomes in an interactive programming environment, the method comprising:
 receiving an event related to a first cell;
 starting with a stored global abstract state, recursively executing, until a terminating criteria is reached, inter-cell analysis on each successor cell of a plurality of cells including the first cell for which the successor cell has a propagation dependency relative to a global abstract state generated by a respective predecessor cell of the successor cell, said recursively executing inter-cell analysis comprising:
  propagating the global abstract state generated by execution of abstract semantics of a predecessor cell to a respective successor cell, and
  applying the generated global abstract state to an execution of abstract semantics of the respective successor cell; and
 communicating information related to outcomes of the inter-cell analysis.

10. The method of claim 9, wherein said recursively executing inter-cell analysis comprises:
 determining a variable of the first cell causes the global abstract state to increase; and
 adding the variable as a top element.

11. The method of claim 9, wherein said recursively executing inter-cell analysis comprises:
 identifying a second cell that has a direct dependency on the first cell.

12. The method of claim 9, wherein said recursively executing inter-cell analysis comprises:
 determining a second cell is an idle cell; and
 pruning the idle cell from the plurality of cells.

13. The method of claim 12, wherein said communicating information related to outcomes of the inter-cell analysis comprises:
 generating a report that indicates a potential outcome in execution of the plurality of cells having the idle cell pruned therefrom.

14. The method of claim 9, wherein a successor cell in the inter-cell analysis has a propagation dependency on a respective predecessor cell if an abstract state generated by execution of abstract semantics of the respective predecessor cell is propagatable to the successor cell based on unbounded variables in the successor cell.

15. The method of claim 9, further comprising:
 determining that a user initiated what-if analysis is associated with the event, wherein said recursively executing the inter-cell analysis is responsive to the determination that the user initiated the what-if analysis.

16. A computer-readable medium having program code recorded thereon that when executed by at least one processor causes the at least one processor to perform a method for communicating potential cell execution outcomes in an interactive programming environment, the method comprising:
- receiving an event related to a first cell;
- executing, in an abstract domain, first intra-cell static analysis for the first cell based on a current global abstract state and abstract semantics of the first cell to generate an updated global abstract state, the first intra-cell static analysis comprising generation of a pre-summary specifying a pre-condition of the first cell; and
- subsequent to said executing the first intra-cell analysis, determining code of the first cell has changed; and
- responsive to the determination that the code of the first cell has changed:
  - re-building the pre-summary, and
  - executing, in the abstract domain, second intra-cell static analysis for the first cell based on the updated global abstract state and the abstract semantics of the first cell to generate a new updated global abstract state.

17. The computer-readable medium of claim 16, wherein the method further comprises:
- parsing code of the first cell to generate an abstract syntax tree (AST); and
- converting the AST into a directed graph that encodes a control flow of statements in the first cell.

18. The computer-readable medium of claim 17, wherein said executing the first intra-cell static analysis for the first cell comprises:
- utilizing the directed graph to generate the updated global abstract state.

19. The computer-readable medium of claim 16, wherein the pre-condition of the first cell for use in determining if the first cell has a propagation dependency for receiving a global abstract state propagated from a second cell.

20. The computer-readable medium of claim 19, wherein said generating the pre-summary comprises:
- utilizing a use-def structure to compute an unbound variable of the first cell, the use-def structure comprising a mapping between a usage of variables and respective definitions of variables.

* * * * *